United States Patent
Ito et al.

(10) Patent No.: US 11,986,365 B2
(45) Date of Patent: May 21, 2024

(54) DENTAL PROSTHESIS COLORING DEVICE, MACHINING APPARATUS, AND COLORING METHOD

(71) Applicant: KURARAY NORITAKE DENTAL INC., Kurashiki (JP)

(72) Inventors: Yoshihisa Ito, Miyoshi (JP); Sho Ito, Miyoshi (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 82 days.

(21) Appl. No.: 17/439,981

(22) PCT Filed: Mar. 19, 2020

(86) PCT No.: PCT/JP2020/012176
§ 371 (c)(1),
(2) Date: Sep. 16, 2021

(87) PCT Pub. No.: WO2020/189745
PCT Pub. Date: Sep. 24, 2020

(65) Prior Publication Data
US 2022/0168080 A1      Jun. 2, 2022

(30) Foreign Application Priority Data

Mar. 20, 2019    (JP) .................. 2019-053329

(51) Int. Cl.
*B41J 3/407*      (2006.01)
*A61C 13/08*      (2006.01)
(Continued)

(52) U.S. Cl.
CPC .......... *A61C 13/082* (2013.01); *A61C 13/083* (2013.01); *B41J 3/4073* (2013.01);
(Continued)

(58) Field of Classification Search
CPC .............................. B41J 3/407; B41J 3/4073
See application file for complete search history.

(56) References Cited

U.S. PATENT DOCUMENTS

2013/0326878 A1    12/2013    Boehm et al.
2018/0264845 A1*    9/2018    Gertlowski ............ B41J 3/4073
2020/0047252 A1*    2/2020    Kritchman .............. B22F 10/62

FOREIGN PATENT DOCUMENTS

CN    103637851 A         3/2014
CN    111072382 A   *   4/2020    ............ B33Y 10/00
(Continued)

OTHER PUBLICATIONS

Fan, MachineTranslationofCN-111072382-A, 2020 (Year: 2020).*
(Continued)

*Primary Examiner* — Scott A Richmond
(74) *Attorney, Agent, or Firm* — Oblon, McClelland, Maier & Neustadt, L.L.P.

(57) ABSTRACT

A coloring device for coloring a dental prosthesis by an inkjet method, the dental prosthesis coloring device includes an inkjet head having a nozzle that ejects ink droplets; a holding unit that holds the prosthesis; a drive unit that moves the inkjet head or the holding unit in a predetermined direction in an XYZ orthogonal coordinate system; and a control unit that controls the inkjet head and the drive unit, wherein the control unit is configured to control the inkjet head and the drive unit based on predetermined coloring data and three-dimensional data of the prosthesis.

20 Claims, 8 Drawing Sheets

(51) Int. Cl.
  *A61C 13/083* (2006.01)
  *B41M 5/00* (2006.01)
  *F27B 17/02* (2006.01)

(52) U.S. Cl.
  CPC .......... *B41M 5/0047* (2013.01); *B41M 5/007* (2013.01); *B41M 5/0088* (2013.01); *F27B 17/025* (2013.01)

(56) References Cited

FOREIGN PATENT DOCUMENTS

| DE | 10 2012 011 371 A1 | | 12/2013 | | |
|----|---|---|---|---|---|
| EP | 2 674 129 A1 | | 12/2013 | | |
| JP | 2003-340813 A | | 12/2003 | | |
| JP | 2003340813 A | * | 12/2003 | ......... | A61C 13/0019 |
| JP | 2010-220882 A | | 10/2010 | | |
| JP | 2010220882 A | * | 10/2010 | | |
| JP | 2012-24395 A | | 2/2012 | | |
| JP | 2017-6445 A | | 1/2017 | | |
| JP | 2018-143393 A | | 9/2018 | | |
| JP | 2018143393 A | * | 9/2018 | ......... | A61C 13/0022 |
| JP | 2018-158564 A | | 10/2018 | | |
| WO | 2009/154301 A1 | | 12/2009 | | |

OTHER PUBLICATIONS

Kadobayashi, MachineTranslationofJP-2018143393-A, 2018 (Year: 2018).*
Eguchi, MachineTranslationofJP-2010220882-A, 2010 (Year: 2010).*
Sukai, Machine TranslationofJP-2003340813-A, 2003 (Year: 2003).*
Extended European Search Report dated Nov. 11, 2022, in European Patent Application No. 20772863.5, 7 pages.
International Search Report dated Jun. 16, 2020 in PCT/JP2020/012176 filed Mar. 19, 2020, 2 pages.

* cited by examiner

DENTAL PROSTHESIS COLORING DEVICE, MACHINING APPARATUS, AND COLORING METHOD

CROSS-REFERENCE TO RELATED APPLICATIONS

The present application is the national stage of international application PCT/JP2020/012176, filed on Mar. 19, 2020, and claims the benefit of the filing date of Japanese Appl. No. 2019-053329, filed on Mar. 20, 2019.

TECHNICAL FIELD

The present disclosure relates to a dental prosthesis coloring device, a machining apparatus including the coloring device, and a coloring method.

BACKGROUND ART

In recent years, ceramic materials with high biocompatibility and strength have been widely used in prosthodontic treatment such as crown treatment and implant treatment in which tooth defects are repaired with artificial materials (prostheses). As a technique for producing a prosthesis using such a material, a machining apparatus has been developed which acquires three-dimensional data of a patient's tooth form and machines a ceramic-based block material into a prosthesis of a desired shape by, for example, laser machining based on the three-dimensional data (e.g., refer to JP 2017-6445 A).

The color of the prosthesis after machining is different from the hue of the patient's natural teeth because the color of the prosthesis is the color of the ceramic material itself. Therefore, a coloring agent which develops color by firing is applied to the surface of the prosthesis, and then the prosthesis is fired to form a sintered body, thereby adjusting the hue of the prosthesis closer to the patient's natural teeth and to a more natural hue to enhance aesthetics.

However, the coloring operation of the prosthesis is carried out by, for example, a dental technician using an applicator such as a brush, by adding different colors for different parts, and therefore a skilled technique is required, which requires labor and time. Variations in color tone may also occur depending on the skill of, for example, a dental technician, and stable color tone may not be obtained.

On the other hand, JP 2010-220882 A discloses a method of manufacturing a prosthesis in which the surface of the prosthesis is automatically colored by printing a colored ink by an inkjet method.

SUMMARY

However, in the invention described in JP 2010-220882 A, an oily ink containing a pigment as a main component is used, so that a prosthesis made of a porous material such as ceramics is difficult to penetrate the ink and difficult to produce a good finish.

The present disclosure has been made in view of the above circumstances, and enables to color a dental prosthesis more easily, more quickly, efficiently and with a good finish.

In order to achieve the above object, a dental prosthesis coloring device according to the present disclosure is a coloring device for coloring a dental prosthesis by an inkjet method, the device including an inkjet head having a nozzle that ejects ink droplets, a holding unit that holds the prosthesis, a drive unit that moves the inkjet head or the holding unit in a predetermined direction in an XYZ orthogonal coordinate system, and a control unit that controls the inkjet head and the drive unit, in which the control unit is configured to control the inkjet head and the drive unit based on predetermined coloring data and three-dimensional data of the prosthesis and.

DESCRIPTION OF EMBODIMENTS

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

First Embodiment

Figure 1:
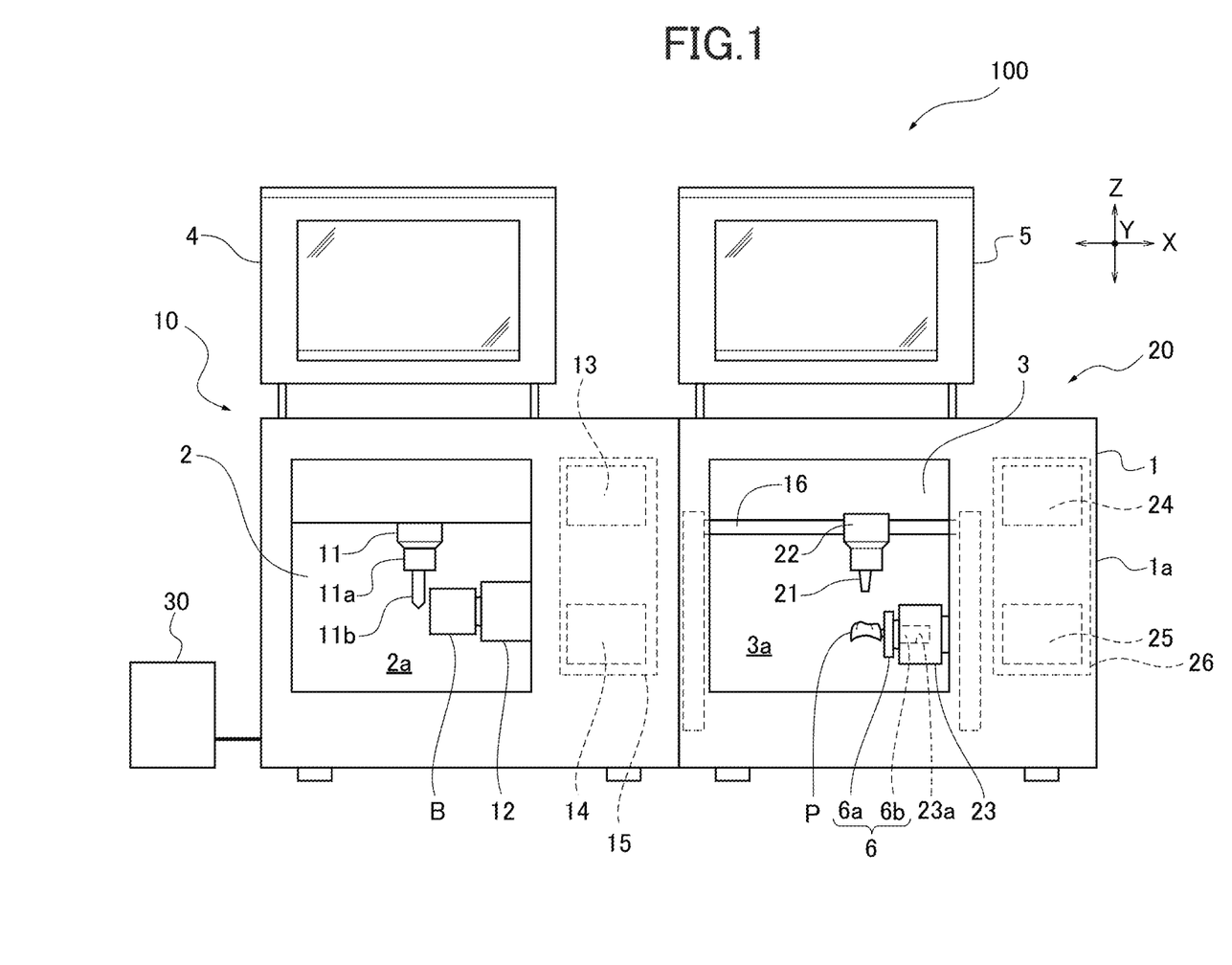
FIG. 1 is a diagram illustrating a schematic configuration of a dental prosthesis machining apparatus including a dental prosthesis coloring device according to a first embodiment.
Figure 2:
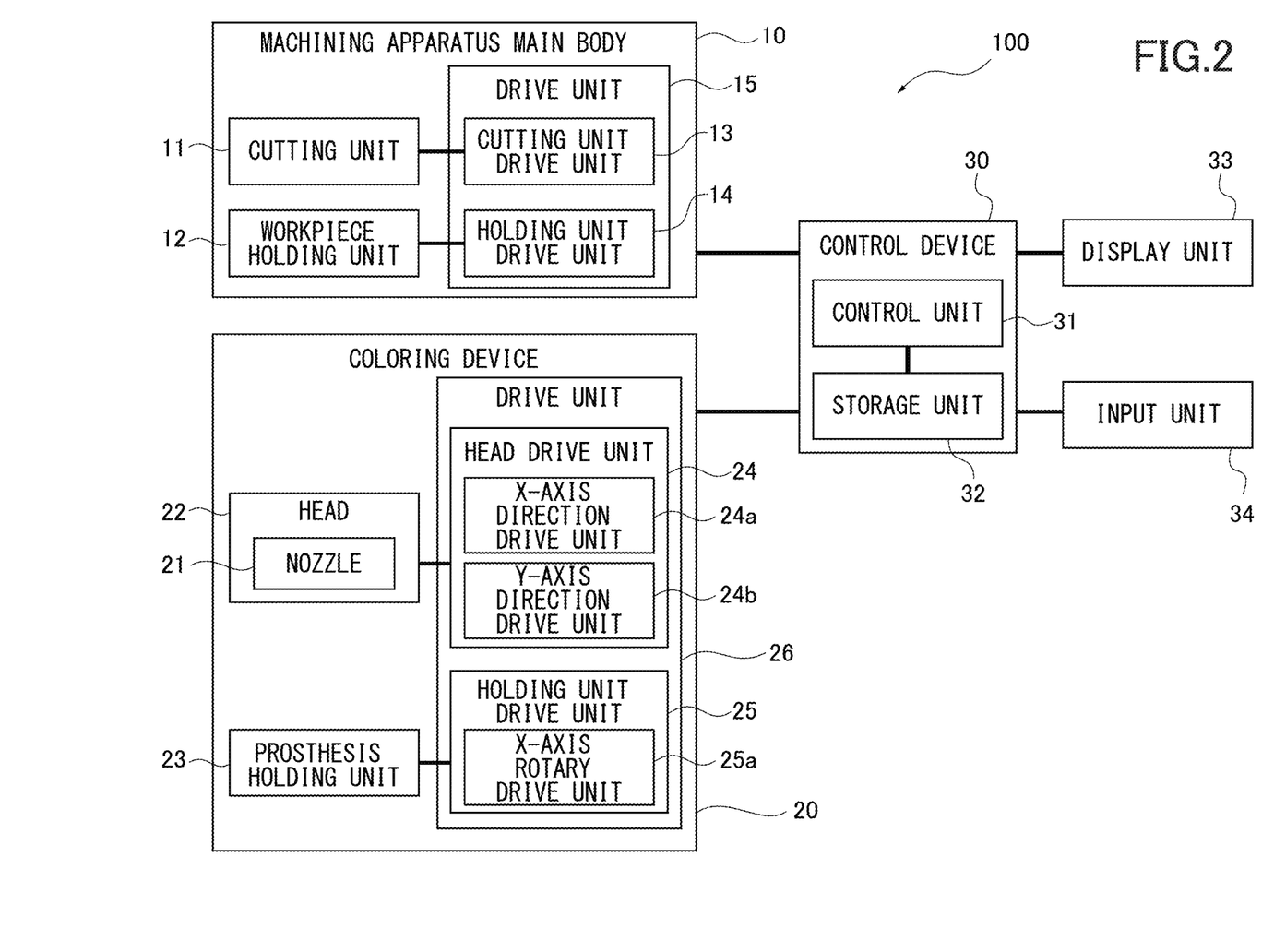
FIG. 2 is a block diagram illustrating a schematic configuration of the machining apparatus illustrated in FIG. 1.

A dental prosthesis coloring device (hereinafter referred to simply as a "coloring device") and a dental prosthesis machining apparatus including the coloring device according to a first embodiment will be described below with reference to the drawings. FIG. 1 is a diagram illustrating a schematic configuration of a machining apparatus 100 including a coloring device 20 according to the first embodiment, and FIG. 2 is a block diagram illustrating a schematic configuration of the machining apparatus 100.

As illustrated in FIG. 1, the machining apparatus 100 according to the first embodiment includes a machining apparatus main body 10, a coloring device 20, and a control device 30. Alternatively, the machining apparatus 100 may include, for example, a measuring device such as a digital camera, a digital video camera and a 3D scanner for acquiring an image of, for example, a tooth, a negative or a positive, and a firing device for firing a prosthesis P.

The control device 30 controls the entire operation of the machining apparatus 100, but also functions as a controller for each of the machining apparatus main body 10 and the coloring device 20. The control device 30 may also function as a design device for designing three-dimensional data and coloring data used for machining and coloring a workpiece B. The control device 30 will be described in detail below.

In the present description, as illustrated in FIG. 1, an X-axis, a Y-axis and a Z-axis of XYZ orthogonal coordinates are set herein. The present description will be described in which in FIG. 1, the horizontal direction is the X-axis direction, the front-rear direction is the Y-axis direction, and the vertical direction is the Z-axis direction. The X-axis direction corresponds to the main scanning direction of the coloring device 20, and the Y-axis direction corresponds to the sub-scanning direction of the coloring device 20.

The machining apparatus main body 10 and the coloring device 20 are provided in parallel in a housing 1 covered by a cover member 1a. The housing 1 is provided inside with a machining chamber 2 for cutting the workpiece B by the machining apparatus main body 10 and a coloring chamber 3 for coloring the prosthesis P obtained by the machining by the coloring device 20. The machining apparatus main body 10 and the coloring device 20 are provided with door bodies 4, 5, respectively, for taking in and out the workpiece B and the prosthesis P so as to be freely opened and closed.

Figure 3A:
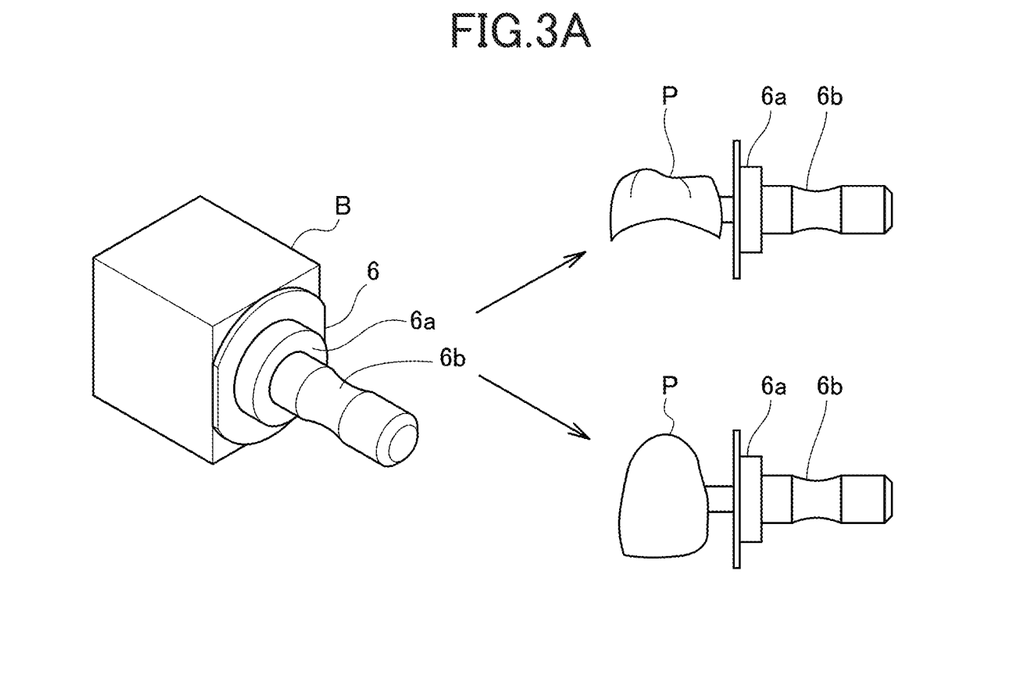
FIG. 3A is an illustration for explaining a workpiece and a prosthesis, and illustrates an example of a workpiece and a prosthesis obtained by cutting the workpiece.

The machining apparatus main body 10 is a device for cutting the workpiece B to produce the dental prosthesis P such as a crown, bridge or implant (see FIG. 3A). The machining apparatus main body 10 includes a cutting unit 11, a workpiece holding unit 12, a drive unit 15 having a cutting unit drive unit 13 and a holding unit drive unit 14, and a control device 30. The machining apparatus main body 10 includes, for example, a dust collecting pipe and a dust collecting device for collecting and removing dust in the machining space 2a. In the present embodiment, a known and suitable CAD/CAM machining apparatus having these configurations can be applied as the machining apparatus main body 10.

The cutting unit 11 is provided in the machining space 2a of the machining chamber 2, and cuts the workpiece B which is a raw material of the dental prosthesis P to produce the prosthesis P. The cutting unit 11 is movable in the X-axis direction and the Z-axis direction by the cutting unit drive unit 13. The cutting unit 11 is constituted of a spindle 11a and a tool 11b which is detachably provided on the spindle 11a and composed of, for example, a ball end mill. The spindle 11a is rotated with the Z-axis as the rotation axis by the cutting unit drive unit 13. The rotation with, for example, the Z-axis as the axis of rotation is hereinafter referred to as a "rotation about the Z-axis", for example.

The workpiece holding unit 12 is provided in the machining space 2a of the machining chamber 2 to detachably hold the workpiece B. In order to enable three-dimensional machining of the workpiece B, the workpiece holding unit 12 is movable in the Y-axis direction by the holding unit drive unit 14 and is rotatable about the X-axis.

The components of the cutting unit 11, and the workpiece holding unit 12 can be moved in the above-mentioned direction. Thus, the relative positional relationship between the tool 11b of the cutting unit 11 and the workpiece B held by the workpiece holding unit 12 can be changed in any direction of the X-axis direction, the Y-axis direction, and the Z-axis direction. Therefore, the machining apparatus main body 10 can perform three-dimensional machining of the workpiece B.

The cutting unit drive unit 13 moves the cutting unit 11 in the X-axis direction and the Z-axis direction and rotates about the Z-axis under the control of the control unit 31 of the control device 30. Therefore, the cutting unit drive unit 13 more specifically includes an X-axis direction drive mechanism, a Z-axis direction drive mechanism, and a Z-axis rotary drive mechanism, for example.

The holding unit drive unit 14 moves the workpiece holding unit 12 in the Y-axis direction and rotates about the X-axis under the control of the control unit 31 of the control device 30. Therefore, the holding unit drive unit 14 more specifically includes a Y-axis direction drive mechanism and an X-axis rotary drive mechanism, for example.

The cutting unit drive unit 13 and the holding unit drive unit 14 can be constituted of a ball screw mechanism, a rack and pinion mechanism, a crank slider mechanism, a fluid cylinder which moves linearly by pneumatic pressure, hydraulic water pressure or hydraulic oil pressure, a spindle motor, or an electric motor, for example.

FIG. 3A illustrates an example of the workpiece B and the prosthesis P obtained by machining the workpiece B. As the workpiece B, for example, a block body having a substantially cubic shape is used, but the workpiece is not limited thereto, and may be any known body. On one surface of the workpiece B, a metal mounting member 6 for mounting the workpiece B to the workpiece holding unit 12 is adhesively fixed. The mounting member 6 is provided with a pedestal 6a and a pin 6b projecting from the pedestal 6a.

The material (raw material) of the workpiece B and the prosthesis P may be any material used as a dental material, such as a crown, a bridge or an implant, for example, and is not limited to any particular type. For example, a ceramic-based porous body having excellent biocompatibility and strength when completed as a prosthesis after sintering is suitably used, and among these materials, a zirconia porous body is most suitably used because of having higher biocompatibility and strength and also being excellent in aesthetics.

The coloring device 20 is a device for coloring the prosthesis P machined by a machining apparatus main body 10 by an inkjet method. The coloring device 20 mainly includes an inkjet head 22 having a nozzle 21, a prosthesis holding unit 23, a drive unit 26 having a head drive unit 24 and a holding unit drive unit 25, and a control device 30.

The inkjet head (hereinafter referred to simply as a "head") 22 is provided in the coloring space 3a of the coloring chamber 3 and has at least one nozzle 21 for ejecting ink droplets of colored ink. The colored ink is supplied to the head 22 from an ink supply source such as an ink tank. When only one color of the colored ink is used, only one nozzle 21 is required, but if a plurality of nozzles 21 are provided so that the colored ink of a plurality of colors can be ejected, the color of the prosthesis P can be colored by adding different colors or gradation, and the hue of the prosthesis P can be made closer to natural teeth.

The head 22 is provided with an ejection mechanism for ejecting ink droplets from the nozzle 21. The ejection type of the ejection mechanism is not limited to any particular type, and a type generally used for inkjet printers such as a piezo type or a thermal type can be applied.

The head 22 is mounted to a guide rail 16 arranged along the main scanning direction (X-axis direction in the present description), and is movable at least in the main scanning direction (X-axis direction) by the head drive unit 24. The head 22 may be movable in the sub-scanning direction (Y-axis direction in the present description) intersecting the main scanning direction, or may also be movable in a direction (Z-axis direction in the present description) intersecting these directions.

In the present embodiment, the head 22 is movable in the X-axis direction and the Y-axis direction by the head drive unit 24, and is also movable in the Y-axis direction while reciprocating in the X-axis direction, but may be movable in the X-axis direction while reciprocating in the Y-axis direction.

The moving member is not limited to the head 22, and the prosthesis holding unit 23 may be movable in these directions. The head 22 and the prosthesis holding unit 23 may be relatively movable in at least any directions of the X-axis, Y-axis, and Z-axis directions, more preferably in two directions of the X-axis and Y-axis directions, and still more preferably in three directions of the X-axis, Y-axis, and Z-axis directions.

The colored ink is a colored ink used for coloring the dental prosthesis P. The colored ink may be used in an inkjet printer, and is not limited to any particular type. For example, when a ceramic-based porous body such as zirconia is used as the material of the prosthesis P, it is preferable to use a colored ink that is applied to the calcined body (semi-sintered body) and develops color by firing. As the colored ink, an appropriate one can be used depending on the material and properties of the prosthesis P.

In order to provide a ceramic-based porous body suitable for coloring, specifically, the colored ink desirably contains at least any of Ti (titanium), V (vanadium), Cr (chromium), Mn (manganese), Fe (iron), Co (cobalt), Ni (nickel), Cu (copper), Bi (bismuth), Pr (praseodymium), Eu (europium), Tb (terbium), Er (erbium), Tm (thulium), or oxides thereof. Alternatively, the colored ink desirably contains at least any of Ti (titanium), V (vanadium), Cr (chromium), Mn (manganese), Fe (iron), Co (cobalt), Ni (nickel), Cu (copper), Bi (bismuth), Pr (praseodymium), Eu (europium), Tb (terbium), Er (erbium), Tm (thulium), Si (silicon), or oxides thereof. Containing these components allows the prostheses P after firing to be developed in a hue closer to that of natural teeth. The colored ink may contain one component or two or more components selected from these components, depending on the color of the colored ink, the material of the prosthesis P to be applied, the properties, or the color developing method, for example. The colored ink is not limited to one containing these components, but may contain other components. The colored ink also contains a solvent, an additive and other component necessary as the colored ink of the inkjet type coloring device 20.

Figure 3B:
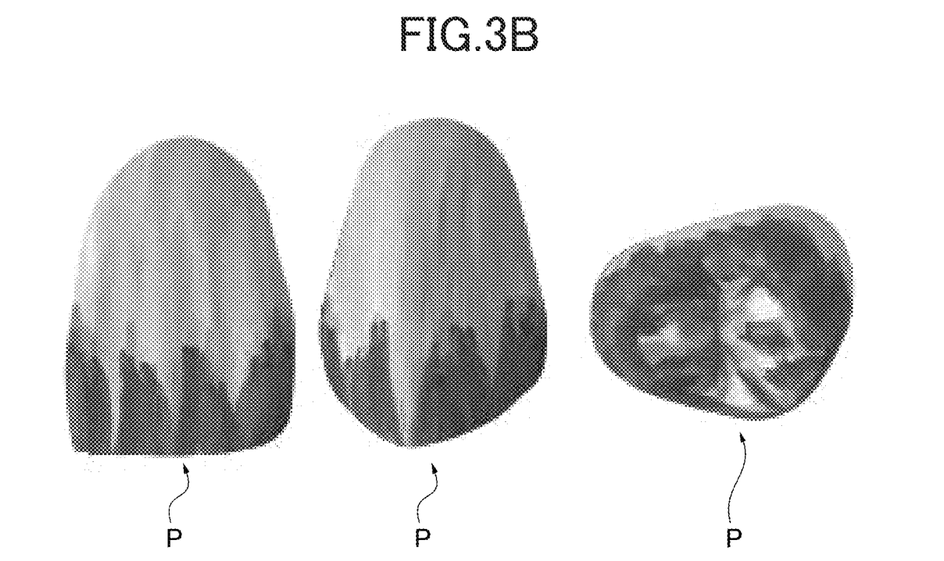
FIG. 3B is an illustration for explaining a workpiece and a prosthesis, and illustrates a colored image of the prosthesis.

When an operator such as a dental technician applies a colored ink by hand in the conventional manner, the colored ink contains a coloring material which disappears by firing so that the operator can grasp the application state by visual observation. On the other hand, in the present embodiment, the prosthesis P is automatically colored by the coloring device 20, so that containing such a coloring material is not required. However, such a coloring material may be contained, and for example, the operator can easily confirm whether the prosthesis P is before coloring or after coloring. FIG. 3B illustrates an example of a color coating pattern according to the type and shape of the prosthesis P.

The type of the colored ink is not limited to any particular type as long as the ink contains the above-mentioned components, and may be an aqueous ink, an oily ink, or a solvent-based ink. Among these inks, the aqueous ink is most suitable from the viewpoint of permeability to the ceramic-based porous body and burden on the firing furnace.

The prosthesis holding unit 23 is provided in the coloring space 3a of the coloring chamber 3 to detachably hold the prosthesis P. Since the mounting member 6 to the workpiece holding unit 12 of the machining apparatus main body 10 is connected to the prosthesis P, the prosthesis holding unit 23 is provided with a hole portion 23a for inserting and fixing the pedestal 6a and the pin 6b so as to utilize the mounting member 6. The insertion of the pedestal 6a and the pin 6b into the hole portion 23a allows the prosthesis P to be fixed by the prosthesis holding unit 23, and unexpected falling and looseness to be suppressed.

The surface of the prosthesis P which is visible from the outside when worn in the oral cavity, for example, an occlusal face and a buccal face (surface), may be colored to ensure aesthetics. More preferably, if coloring can be applied to a wider range such as the outer edge and the back surface of the prosthesis P, the aesthetics can be further improved. Therefore, in the present embodiment, in order to apply coloring to a wider range of the prosthesis P, the holding unit drive unit 25 is configured to be able to rotate the prosthesis holding unit 23 about the X-axis.

As illustrated in FIG. 2, the head drive unit 24 includes an X-axis direction drive unit 24a for moving the head 22 in the X-axis direction, and a Y-axis direction drive unit 24b for moving the head 22 in the Y-axis direction. The holding unit drive unit 25 includes an X-axis rotary drive unit 25a for rotating the prosthesis holding unit 23 about the X-axis. The head drive unit 24 may further include, for example, a Z-axis direction drive unit or the like for moving the head 22 or the prosthesis holding unit 23 in the Z-axis direction, so that coloring of the three-dimensional prosthesis P can be performed more elaborately.

The control device 30 controls the operation of the entire machining apparatus 100 including the control of the machining apparatus main body 10 and the coloring device 20. The control device 30 is mainly constituted of, for example, a personal computer (PC) or a microcomputer provided with a Central Processing Unit (CPU), a Read Only Memory (ROM), a Random Access Memory (RAM), a non-volatile storage such as a hard disk drive and a flash memory, a communication interface, and an external recording medium interface, for example.

The control device 30 includes a display unit 33 and an input unit 34, for example. The display unit 33 includes, for example, a liquid crystal display, and displays, for example, an operation screen of the machining apparatus main body 10 and the coloring device 20. The input unit 34 includes, for example, a touch panel, a keyboard, a mouse, an operation button which are mounted on the liquid crystal display, and can input, for example, various operation instructions to the control device 30.

The control device 30 functionally includes a control unit 31 and a storage unit 32. The control unit 31 is constituted of, for example, a CPU, and the storage unit 32 is constituted of a RAM, a ROM, and a nonvolatile storage. The storage unit 32 also includes an external recording medium accessible via an external recording medium interface. Examples of the external recording medium include an SD card, a USB memory, a CD, and a DVD. The CPU uses the RAM as a work area to read out and execute an operating system or other programs stored in the storage unit 32 such as a ROM, thereby controlling the operation of the entire machining apparatus 100.

The storage unit 32 stores, for example, the various programs and parameters used by the programs. Further, the storage unit 32 stores, for example, three-dimensional data or coloring data for machining the workpiece B in the machining apparatus main body 10 and coloring the prosthesis P in the coloring device 20.

On the basis of the three-dimensional data, the control unit 31 controls the machining apparatus main body 10, drives the drive unit 15 to move or rotate a cutting unit 11 and the workpiece holding unit 12, and drives the cutting unit 11 to cut the workpiece B. Further, on the basis of the three-dimensional data and the coloring data, the control unit 31 controls the coloring device 20, drives the drive unit 26 to move or rotate the head 22 and the prosthesis holding unit 23, and ejects ink droplets from the nozzle 21 to color the prosthesis P.

The three-dimensional data is a three-dimensional coordinate address representing the three-dimensional shape of the prosthesis P to be machined or colored. The three-dimensional data is generated by, for example, an external design device, and stored in the storage unit 32 by using an external recording medium such as an SD card. The machining apparatus 100 may acquire three-dimensional data from a design device connected via a wired or a wireless communication device and store the data in the storage unit 32.

When only coloring is performed by the coloring device 20 on the prosthesis P machined by another existing machining apparatus, three-dimensional data of the existing machining apparatus can also be used. In this case as well, three-dimensional data can be acquired from an existing machining apparatus using an external recording medium or a communication device and stored in the storage unit 32.

The control device 30 may have a function as a design device, and the control device 30 may generate three-dimensional data. In this case, for example, a measurement device such as a 3D scanner scans a patient's tooth, a negative or a positive, and the operator designs the three-dimensional shape of the prosthesis P based on the scan data. The control unit 31 generates three-dimensional data based on the design and stores the generated data in the storage unit 32. The generation of the three-dimensional data can be performed using a known method using general-purpose software, for example.

The coloring data is stored in such a manner that color information is associated with a color coating pattern (gradation pattern) for each tooth shape or portion (e.g., upper and lower central incisors, lateral incisors, canines, premolars, or molars). The color information may be primary color values represented by RGB and CMYK values and color data corresponding to these values, or may be shade numbers and the color data corresponding to the shade numbers. The color information may be a combination of symbols given to each color data.

The three-dimensional reference data of a plurality of prostheses having different shapes and the coloring patterns associated with the respective reference data may be stored in the storage unit 32, and the control unit 31 may compare the three-dimensional data of the prostheses P with the reference data to automatically select the corresponding coloring data. The operator may input a color number from the input unit 34, and the control unit 31 may select the coloring data from the storage unit 32 based on the color number. Further, when the operator designs the three-dimensional shape of the prosthesis P by using the control device 30 as the design device, the color and the color coating pattern may also be designed, and the control unit 31 may generate the coloring data based on the design. The control unit 31 may analyze an image of a patient's tooth taken by, for example, a camera to select coloring data.

An example of the operation of the machining process performed by the machining apparatus 100 having the above-described configuration will be described below with reference to the flowchart in FIG. 4. The machining process includes a cutting process (cutting method) performed by the machining apparatus main body 10 and a coloring process (coloring method) performed by the coloring device 20. The cutting process and the coloring process may be carried out continuously or only one of the processes may be carried out independently. A case where the machining apparatus 100 continuously performs the cutting process and the coloring process will be described below.

The operator turns on the power of the machining apparatus 100, mounts the workpiece B to the workpiece holding unit 12 of the machining apparatus main body 10, closes the door body 4, and gives the instruction to start cutting from the input unit 34. When the machining apparatus main body 10 acquires the instruction to start cutting, the cutting process is started.

In step S1, the control unit 31 first acquires three-dimensional data for machining from the storage unit 32. In step S2, the control unit 31 then drives the cutting unit drive unit 13 based on the three-dimensional data, and rotates the spindle 11a while moving the cutting unit 11. In step S3, the control unit 31 drives the holding unit drive unit 14 as necessary to move and rotate the workpiece holding unit 12. The workpiece B is then cut while the cutting unit 11 moves according to the three-dimensional data (step S4). Thus, the prosthesis P having a desired shape is produced.

The operator then takes out the prosthesis P obtained in step S4 from the machining apparatus main body 10, mounts the prosthesis to the prosthesis holding unit 23 of the coloring device 20, and inputs a coloring start instruction from the input unit 34. The coloring device 20 receives the coloring start instruction and starts the coloring process. In step S5, the control unit 31 first acquires the three-dimensional data and the coloring data from, for example, the storage unit 32. The coloring data may be predetermined or may be selected and acquired from the storage unit 32 based on, for example, the color number inputted from the input unit 34 by the operator.

In step S6, the control unit 31 then drives the head drive unit 24 based on the three-dimensional data to move the head 22 in the X-axis direction and the Y-axis direction. In step S7, the control unit 31 drives the holding unit drive unit 25 as necessary to move and rotate the prosthesis holding unit 23. In step S8, the control unit 31 then controls the head 22 based on the coloring data while adjusting the position of the head 22 by the head drive unit 24 (and further rotating the prosthesis holding unit 23 by the holding unit drive unit 25 as necessary), and ejects ink droplets from the nozzle 21 to color the prosthesis P. The above operation allows the prosthesis P to be colored with a desired color and color coating pattern.

The prosthesis P is then fired by the firing device to form a sintered body, so that the prosthesis P having a hue closer to the natural color can be obtained.

As described above, the coloring device 20 and the machining apparatus 100 including the coloring device 20 according to the first embodiment drive the drive unit 26 under the control of the control unit 31, and control the inkjet head 22 to eject ink droplets from the nozzle 21 while moving the inkjet head 22 or the prosthesis holding unit 23 in a predetermined direction (e.g., in at least any of the X-axis, Y-axis, and Z-axis directions) in the XYZ orthogonal coordinate system. Thus, the machining apparatus 100 colors the three-dimensional prosthesis P in a desired color and a color coating pattern. In comparison with manual coloring, coating unevenness and variation in color tone are suppressed to enable coloring in a more uniform and stable color tone. Accordingly, it is possible to provide the coloring device 20, the machining apparatus 100, and the coloring method that can color the dental prosthesis P more easily, more quickly, efficiently and with a good finish.

In the first embodiment, the machining apparatus main body 10 and other existing machining apparatuses incorporate three-dimensional data used for machining as three-dimensional data for coloring in the coloring device 20. Thus, coloring can be performed by the same coordinate system as in the machining of the prosthesis P, appropriate and more accurate coloring can be performed according to the machining shape, and the coloring operation can be performed more efficiently.

The first embodiment is such that the machining apparatus main body 10 and the coloring device 20 are provided in parallel and the machining space 2a and the coloring space 3a are separate spaces, but is not limited to this configuration. For example, the machining of the workpiece B and the coloring of the prosthesis P may be performed in one space. In other words, the cutting unit 11 and the head 22 are arranged in the space, respectively, or arranged in the space replaceably, and the workpiece holding unit 12 is also used as the prosthesis holding unit 23. Thus, the holding unit and the holding unit drive unit can be integrated into one. The workpiece B held by the holding unit is cut by the cutting unit 11 to produce the prosthesis P, and after a process such as dust treatment is performed, coloring can be continuously performed by using the head 22 while the prosthesis P is held by the holding unit, and labor for attachment and detachment can be eliminated. A part or whole of the drive units of the cutting unit 11 and the head 22 can be concurrently used. Such a configuration allows the number of components and the volume of the machining apparatus including the coloring device to be reduced, thereby achieving compactness, cost reduction, and efficiency of the operation.

In the machining apparatus 100 of the first embodiment, the holding unit may be configured to freely move in and out of the machining chamber 2 and the coloring chamber 3. This configuration allows the workpiece B to be cut in the machining space 2a of the machining chamber 2, and then the prosthesis P obtained to be moved from the machining chamber 2 to the coloring chamber 3 by the holding unit, and the prosthesis P to be colored in the coloring space 3a. Thus, the labor for taking in and out the prosthesis P by the operator is eliminated, and the operating time is shortened and the operation is simplified.

The first embodiment is such that the coloring device 20 is incorporated into the machining apparatus 100, but is not limited to this configuration. For example, the coloring device 20 having the configuration such as the first embodiment may be manufactured and provided as a single unit. Thus, the coloring device 20 can color the prosthesis P machined by the existing machining apparatus. Therefore, the user can continue to use the already installed machining apparatus and only need to install a new coloring device 20, thus reducing the installation cost.

Second Embodiment

Figure 5:
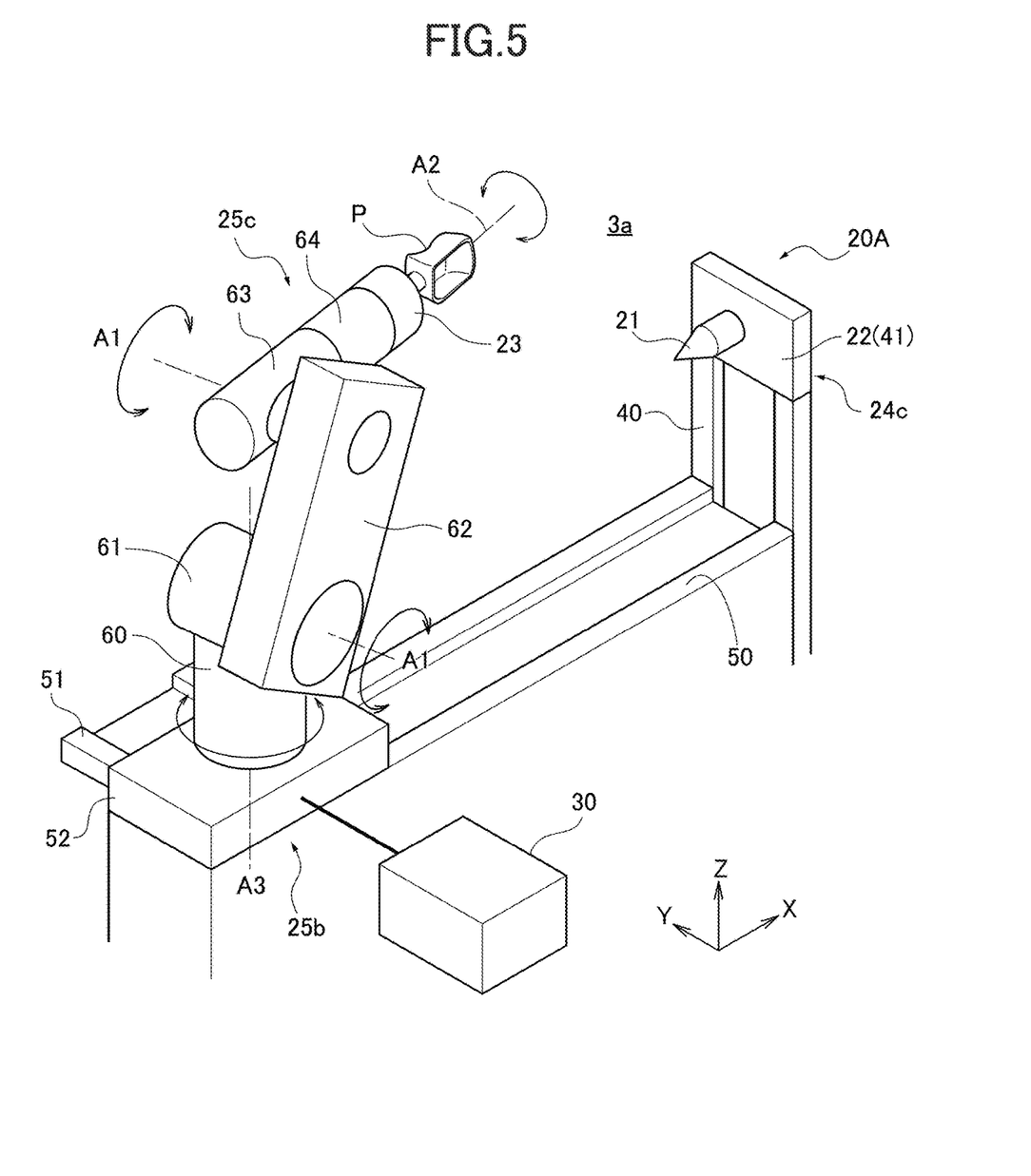
FIG. 5 is a diagram illustrating a schematic configuration of a main portion of a dental prosthesis coloring device according to a second embodiment.
Figure 6:
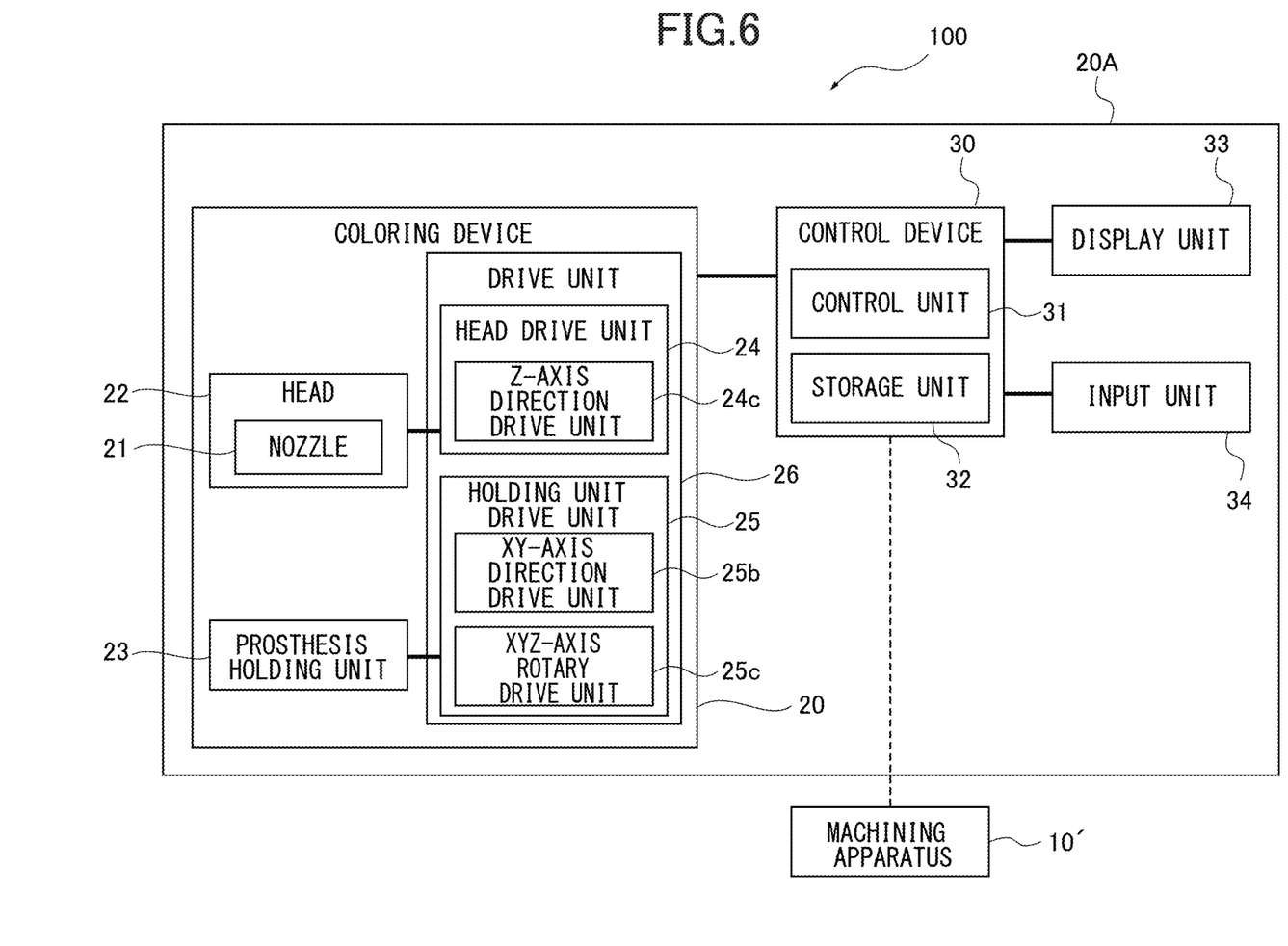
FIG. 6 is a block diagram illustrating a schematic configuration of the coloring device illustrated in FIG. 5.

A coloring device 20A of a second embodiment will be described below with reference to FIGS. 5, 6. FIG. 5 is a diagram illustrating a schematic configuration of a main portion of the coloring device 20A according to the second embodiment, and FIG. 6 is a block diagram illustrating a schematic configuration of the coloring device 20A.

The coloring device 20A according to the second embodiment is a device for coloring a prosthesis P machined by a predetermined machining apparatus 10' by an inkjet method. As illustrated in FIGS. 5, 6, the coloring device 20A according to the second embodiment mainly includes an inkjet head (head) 22 having a nozzle 21, a prosthesis holding unit 23, a drive unit 26 having a head drive unit 24 and a holding unit drive unit 25, and a control device 30. The control device 30 includes a control unit 31 and a storage unit 32, and is further provided with a display unit 33 and an input unit 34.

The head 22 having the nozzle 21 is provided in the coloring space 3a of the coloring device 20A. The mechanism for ejecting the colored ink and the ink droplets from the nozzle 21 can be the same as that in the first embodiment.

The head drive unit 24 includes a Z-axis direction drive unit 24c for moving the head 22 in the Z-axis direction. As illustrated in FIG. 5, the Z-axis direction drive unit 24c includes a guide rail 40, a slider 41 movably provided on the guide rail 40, and a drive motor for moving the slider 41, for example. The head 22 is fixed to the slider 41. In this configuration, the Z-axis direction drive unit 24c can freely adjust the height of the head 22 by moving the head 22 in the Z-axis direction.

The holding unit drive unit 25 includes an XY-axis direction drive unit 25b for moving the prosthesis holding unit 23 in the X-axis direction and the Y-axis direction, and an XYZ-axis rotary drive unit 25c for rotating the prosthesis holding unit 23 about the X-axis, Y-axis, and Z-axis.

The XY-axis direction drive unit 25b includes a first guide rail 50 extending in the X-axis direction, a second guide rail 51 extending in the Y-axis direction, a slider 52 provided movably on the first and second guide rails 50, 51, and a drive motor for moving the slider 52, for example. Since the XY-axis direction drive unit 25b has the first and second guide rails 50, 51 extending in the X-axis direction and the Y-axis direction, respectively, the prosthesis holding unit 23 can be moved in the two-dimensional direction of XY.

The XYZ-axis rotary drive unit 25c is fixed on the slider 52. The XYZ-axis rotary drive unit 25c includes: a fixed portion 60 fixed to the slider 52; a first arm unit 61 rotatably provided on the fixed portion 60 about the Z-axis (a third axis A3); a second arm unit 62 rotatably provided on the first arm unit 61 about a first axis A1 intersecting the Z-axis; a third arm unit 63 rotatably provided on the second arm unit 62 about the first axis A1; and a fourth arm unit 64 rotatably provided on the third arm unit 63 about a second axis A2 intersecting the first axis A1. The prosthesis holding unit 23 is fixed to the distal end of the fourth arm unit 64, and is rotatable about the second axis A2 together with the fourth arm unit 64.

In the basic posture of the XYZ-axis rotary drive unit 25c as illustrated in FIG. 5, the first axis A1 is substantially matched with the X-axis, and the second axis A2 is substantially matched with the Y-axis. On the other hand, the rotation of the first arm unit 61 about the Z-axis or the rotation of the third arm unit 63 about the first axis A1 causes the first axis A1 and the second axis A2 to be mismatched with the X-axis or the Y-axis. The first axis A1 may be substantially matched with the Y-axis and the second axis A2 may be substantially matched with the X-axis, depending on the rotational position about the Z-axis. Further, the first axis A1 and the second axis A2 may intersect the X-axis, the Y-axis, and the Z-axis. In either case, the XYZ-axis rotary drive unit 25c can rotate the prosthesis holding unit 23 about three axes: the Z-axis, and the first axis A1 and the second axis A2 different from the Z-axis. Therefore, the XYZ-axis rotary drive unit 25c can arrange the prosthesis P held by the prosthesis holding unit 23 at a desired position and posture with respect to the nozzle 21.

Figure 4:
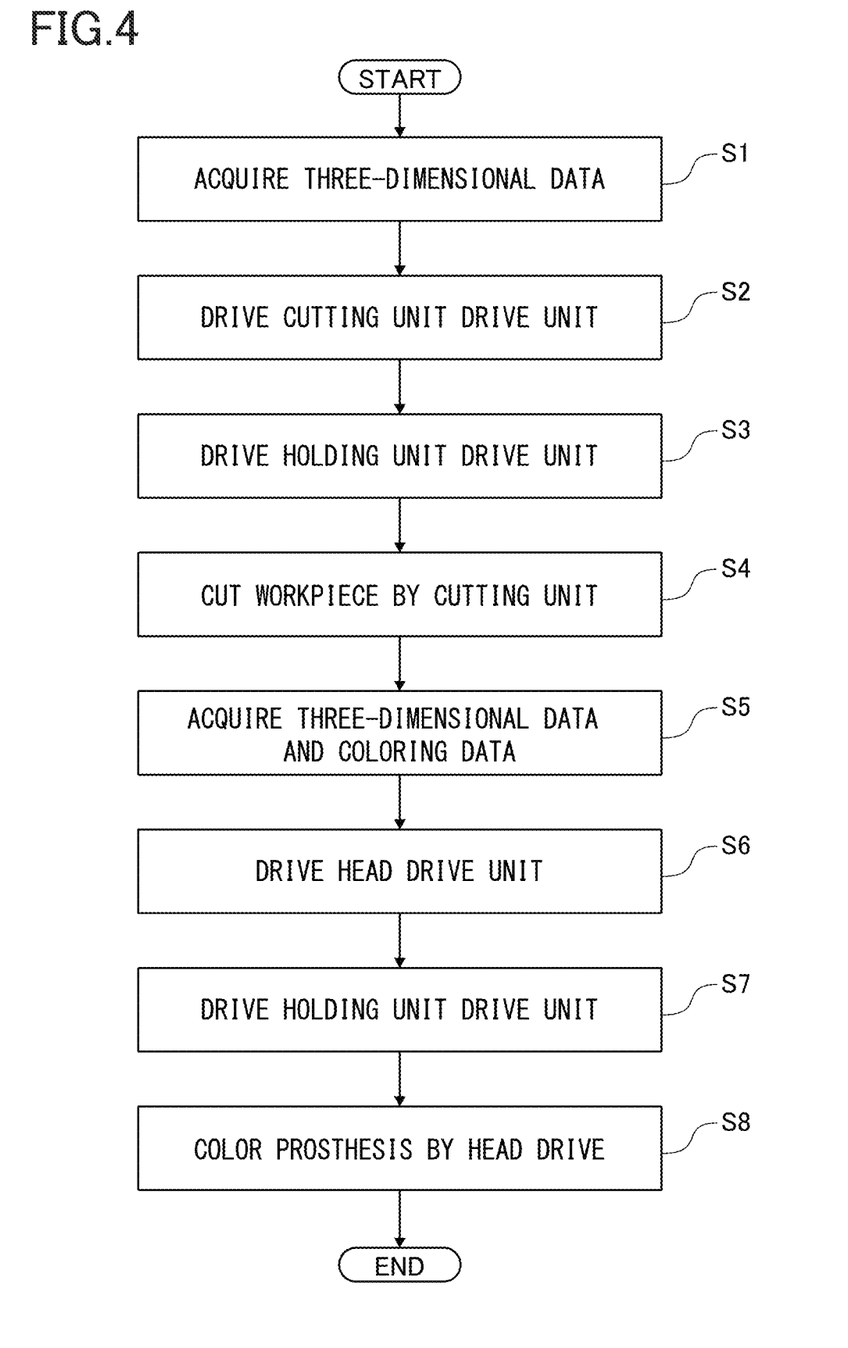
FIG. 4 is a flowchart illustrating an example of a flow of operations of a machining process (cutting process and coloring process) performed by the machining apparatus illustrated in FIG. 1.

As in the coloring device 20 of the first embodiment, the coloring device 20A of the second embodiment having the above-described configuration basically performs the processes of steps S5 to S8 illustrated in FIG. 4 to color the prosthesis P.

The operator first mounts the prosthesis P to be colored to the prosthesis holding unit 23 and inputs a coloring start instruction from the input unit 34. Upon receiving the coloring start instruction, the coloring device 20A starts a coloring process, and in step S5, the control unit 31 acquires three-dimensional data and coloring data from the storage unit 32 and the external recording medium, the external PC (design device), or the existing machining apparatus 10'. In the next step S6, the control unit 31 drives the Z-axis direction drive unit 24c of the head drive unit 24 as necessary to adjust the height of the head 22, based on the three-dimensional data.

In the next step S7, the control unit 31 drives the XY-axis direction drive unit 25b of the holding unit drive unit 25 to move the slider 52 on the first and second guide rails 50, 51, and to position the XYZ-axis rotary drive unit 25c and the prosthesis holding unit 23 on the slider 52 in the X-axis direction and the Y-axis direction. The control unit 31 drives the XYZ-axis rotary drive unit 25c to appropriately perform rotation of the first arm unit 61 about the Z-axis, rotation of the second and third arm units 62, 63 about the first axis A1, and rotation of the fourth arm unit 64 about the second axis A2. Thus, the prosthesis P held by the prosthesis holding unit 23 facing the nozzle 21 is arranged at a desired position and a desired posture (angle) in the XYZ space.

In step S8, the control unit 31 then controls the head 22 based on the coloring data while appropriately changing the position and posture of the prosthesis P with respect to the nozzle 21 by the XYZ-axis rotary drive unit 25c to eject ink droplets from the nozzle 21 to color the prosthesis P.

As described above, the coloring device 20A of the second embodiment can color the prosthesis P in a desired color and a color coating pattern in a more uniform and stable color tone by the inkjet head 22 based on the three-dimensional data and the coloring data, as in the first embodiment. Therefore, the coloring device 20A can color the prosthesis P more easily, more quickly, efficiently and with a good finish.

In the second embodiment, the XYZ-axis rotary drive unit 25c is rotatable about the Z-axis (third axis A3), about the first axis A1, and about the second axis A2, so that the prosthesis P can be arranged at a desired position in the XYZ space in a desired posture. Therefore, not only the occlusal face and the buccal face of the prosthesis P but also a wider range can be three-dimensionally colored, and the coloring accuracy and finish can be further improved to obtain the prosthesis P having higher aesthetics.

Although the coloring device 20A of the second embodiment is provided as a single device separate from the machining apparatus, the coloring device 20A may be incorporated into the machining apparatus. For example, the machining apparatus 100 of the first embodiment may incorporate the coloring device 20A according to the second embodiment instead of the coloring device 20. Such a machining apparatus also allows machining and coloring to be efficiently performed to obtain a prosthesis P having a good finish.

Although the embodiments of the present disclosure have been described in detail with reference to the drawings, the embodiments described above are merely examples of the present disclosure, and the present disclosure is not limited to the configurations of the embodiments described above. Any design change which does not deviate from the gist of the present disclosure will of course be included in the present disclosure.

For example, the coloring devices 20, 20A may include a colorimetric device such as a digital camera, a digital video camera, and a colorimeter. The color of the patient's natural teeth is acquired by the colorimetric device, the color of the colored ink and the coloring pattern are determined by a control unit 31 based on the acquired color, and the color of the prosthesis P is colored. Such a coloring enables to eliminate the labor of designing and to color the prosthesis P in a hue close to that of natural teeth, thereby improving aesthetics.

The control device 30 may also be mounted with artificial intelligence (AI). For example, if three-dimensional data and coloring data are designed by AI, more rapid and more precise data can be obtained, and a prosthesis P closer to the shape and hue of the natural tooth and having higher aesthetics can be obtained.

Further, the coloring devices 20, 20A may be provided in a device having another function. For example, the present disclosure includes a drying device including the dental prosthesis coloring device described above. The drying device may be provided as a single device separate from the coloring device or may be incorporated with the coloring device. The combination of the coloring device and the drying device may be incorporated into another device (e.g., a machining apparatus). After the dental prosthesis is colored by the coloring device, the solvent amount of the ink is calculated with respect to the use amount of the ink used by the operator, and then the drying device is used, thereby enabling efficient drying operation with an optimum drying time. When the drying device further includes a control unit, the control unit automatically calculates an optimum drying time in accordance with the amount of ink used and the operation time required for coloring, thereby enabling efficient drying operation with the optimum drying time. The mechanism of the drying device is not limited to any particular type, and may be an electric heater type, a warm air type, an IH type, or a microwave type.

Figure 7:
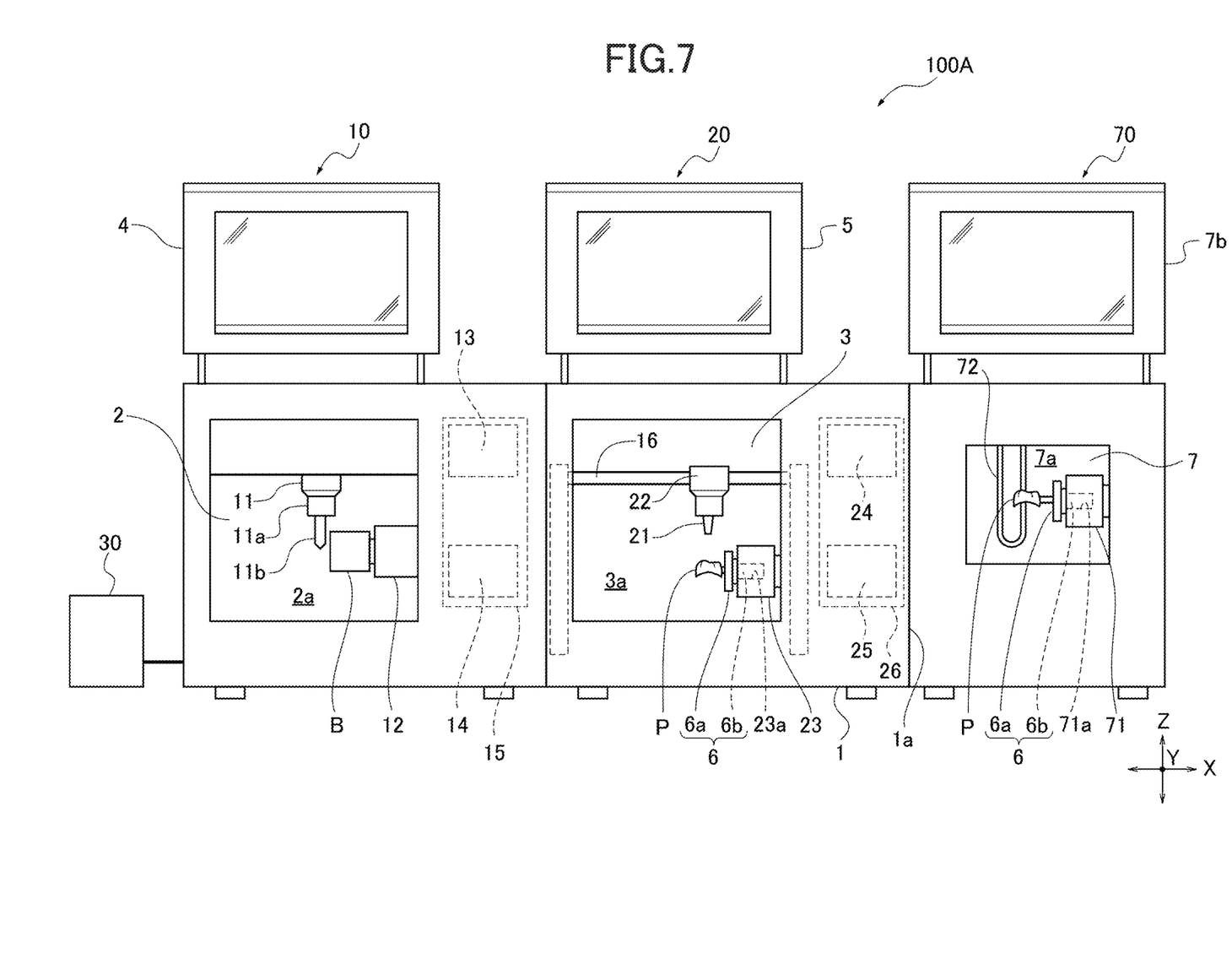
FIG. 7 is a diagram illustrating a schematic configuration of a modification of the dental prosthesis machining apparatus including the dental prosthesis coloring device according to the first embodiment, in which the machining apparatus further includes a drying device.

An example of an embodiment of a machining apparatus provided with the drying device is illustrated in FIG. 7. A machining apparatus 100A illustrated in FIG. 7 is a modification of the first embodiment, in which the machining apparatus 100 including the coloring device 20 of the first embodiment further includes a drying device 70. Therefore, the same configuration as in the first embodiment will not be described. The drying device 70 includes a prosthesis holding unit 71 for detachably holding the prosthesis P in a drying space 7a of a drying chamber 7 having a door body 7b, and a heat source 72 for drying the prosthesis P. As described above, since the mounting member 6 is connected to the prosthesis P, the prosthesis holding unit 71 is provided with a hole portion 71a for inserting and fixing the pedestal 6a and the pin 6b so as to utilize the mounting member 6. The insertion of the pedestal 6a and the pin 6b into the hole portion 71a allows the prosthesis P to be fixed by the prosthesis holding unit 71, and unexpected falling during drying to be suppressed. The machining apparatus 100A may include the coloring device 20A of the second embodiment instead of the coloring device 20.

The present disclosure includes a firing device including the dental prosthesis coloring device described above. The firing device may be provided as a single device separate from the coloring device or may be incorporated with the coloring device. The combination of the coloring device and the firing device may be incorporated into another apparatus (e.g., a machining apparatus). After the dental prosthesis is colored by the coloring device, the operator calculates an optimum firing schedule with respect to the size of the prosthesis and the amount of ink used, and then uses the firing device, thereby enabling efficient firing operation. When the firing device further includes a control unit, the control unit automatically calculates an optimum firing schedule in accordance with the amount of ink used and the operation time required for coloring, thereby enabling efficient firing operation with the optimum firing schedule. The mechanism of the firing device is not limited to any particular type, and may be an electric heater type, an IH type, or a microwave type.

Figure 8:
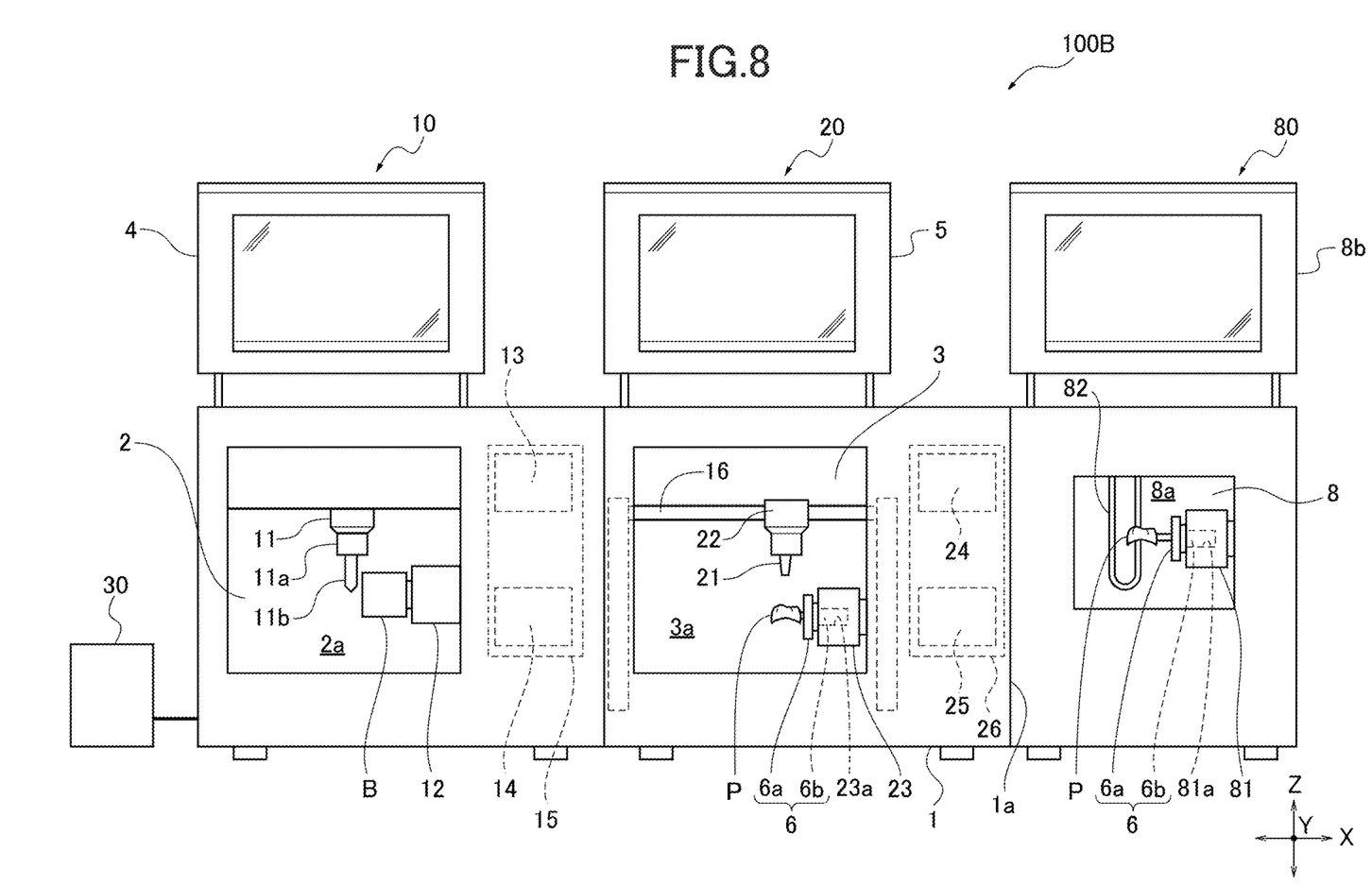
FIG. 8 is a diagram illustrating a schematic configuration of another modification of the dental prosthesis machining apparatus including the dental prosthesis coloring device according to the first embodiment, in which the machining apparatus further includes a firing device.

An example of an embodiment of a machining apparatus provided with the firing device is illustrated in FIG. 8. A machining apparatus 100B illustrated in FIG. 8 is another modification of the first embodiment, in which the machining apparatus 100 including the coloring device 20 of the first embodiment further includes a firing device 80. The firing device 80 includes a prosthesis holding unit 81 for detachably holding the prosthesis P in a firing space 8a of a firing chamber 8 having a door body 8b, and a heat source 82 for firing the prosthesis P. As described above, since the mounting member 6 is connected to the prosthesis P, the prosthesis holding unit 81 is provided with a hole portion 81a for inserting and fixing the pedestal 6a and the pin 6b so as to utilize the mounting member 6. The insertion of the pedestal 6a and the pin 6b into the hole portion 81a allows the prosthesis P to be fixed by the prosthesis holding unit 81, and unexpected falling during firing to be suppressed. The machining apparatus 100B may include the coloring device 20A of the second embodiment instead of the coloring device 20.

The invention claimed is:

1. A dental prosthesis coloring device, comprising:
an inkjet head having a nozzle that ejects ink droplets, configured for an ink that is not oily;
a holding unit that holds a prosthesis which is made of a porous ceramic material;
a drive unit that moves the holding unit in a predetermined direction in an XYZ orthogonal coordinate system; and
a control unit that controls the inkjet head and the drive unit,
wherein the drive unit comprises a rotary drive unit that rotates the holding unit about at least two axes intersecting each other, and
wherein the control unit is configured to control the inkjet head and the drive unit based on predetermined coloring data and three-dimensional data of the prosthesis.

2. The dental prosthesis coloring device of claim 1, wherein the ink comprises Ti, V, Cr, Mn, Fe, Co, Ni, Cu, Bi, Pr, Eu, Tb, Er, Tm, and/or Si, in elemental and/or oxide form.

3. The dental prosthesis coloring device of claim 1, further comprising:
a storage unit in which three-dimensional reference data of a plurality of the prostheses having different shapes and a coloring pattern associated with each reference data are stored in advance,
wherein the control unit compares the three-dimensional data of the prosthesis with the reference data of the storage unit to select corresponding coloring data.

4. A dental prosthesis coloring method performed by the dental prosthesis coloring device of claim 1, the method comprising:
moving the holding unit that holds the prosthesis in a predetermined direction in an XYZ orthogonal coordinate system based on the three-dimensional data and the coloring data;
rotating the holding unit about at least two axes intersecting each other; and
ejecting the ink droplets of a non-oily ink from a nozzle of the inkjet head toward the prosthesis based on the three-dimensional data and the coloring data,
wherein the prosthesis is made of a porous ceramic material which is penetrated by the non-oily ink.

5. The method of claim 4, wherein the prosthesis comprises a ceramic-based porous body.

6. A dental prosthesis machining apparatus, comprising:
the dental prosthesis coloring device of claim 1.

7. A drying device, comprising:
the dental prosthesis coloring device of claim 1.

8. A firing device, comprising:
the dental prosthesis coloring device of claim 1.

9. The dental prosthesis coloring device of claim 1, wherein the ink comprises Ti in elemental and/or oxide form.

10. The dental prosthesis coloring device of claim 1, wherein the ink comprises V in elemental and/or oxide form.

11. The dental prosthesis coloring device of claim 1, wherein the ink comprises Cr in elemental and/or oxide form.

12. The dental prosthesis coloring device of claim 1, wherein the ink comprises Mn in elemental and/or oxide form.

13. The dental prosthesis coloring device of claim 1, wherein the ink comprises Fe in elemental and/or oxide form.

14. The dental prosthesis coloring device of claim 1, wherein the ink comprises Co in elemental and/or oxide form.

15. The dental prosthesis coloring device of claim 1, wherein the ink comprises Ni in elemental and/or oxide form.

16. The dental prosthesis coloring device of claim 1, wherein the ink comprises Cu in elemental and/or oxide form.

17. The dental prosthesis coloring device of claim 1, wherein the ink comprises Bi in elemental and/or oxide form.

18. The dental prosthesis coloring device of claim 1, wherein the ink comprises Pr, Eu, Tb, Er, and/or Tm, in elemental and/or oxide form.

19. The dental prosthesis coloring device of claim 1, wherein the ink comprises Si in elemental and/or oxide form.

20. The dental prosthesis coloring device of claim 1, further comprising:
a colorimetric device configured to acquire a color of a patient's natural teeth,
wherein the control unit is configured to determine a colored ink color and coloring pattern based on acquired color from the colorimetric device, so as to color the prosthesis.

* * * * *